(12) United States Patent
Katayama et al.

(10) Patent No.: US 6,377,641 B1
(45) Date of Patent: Apr. 23, 2002

(54) REPRODUCTION APPARATUS AND REPRODUCTION METHOD

(75) Inventors: Takashi Katayama; Takeshi Fujita; Masahiro Sueyoshi; Kazutaka Abe; Masaharu Matsumoto; Akihisa Kawamura; Kosuke Nishio, all of Osaka; Ryoji Suzuki, Nara; Shinji Kojima, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/735,674

(22) Filed: Dec. 13, 2000

(30) Foreign Application Priority Data

Dec. 14, 1999 (JP) .......................................... 11-355179

(51) Int. Cl.[7] .............................................. G11B 20/10
(52) U.S. Cl. ..................................... 375/354; 369/42.24
(58) Field of Search ....................... 369/47.24; 375/354

(56) References Cited

U.S. PATENT DOCUMENTS 5,315,570 A * 5/1994 Miura et al. .............. 369/47.24
5,777,955 A * 7/1998 Ikeda et al. .............. 369/47.24

* cited by examiner

Primary Examiner—Aristotelis M. Psitos
(74) Attorney, Agent, or Firm—Ratner & Prestia

(57) ABSTRACT

A reproduction apparatus according to the present invention includes: a signal input section for receiving an input signal having an input signal type; a synchronization signal detection section for detecting a predetermined synchronization signal in the input signal and determining the input signal type in accordance with an occurrence frequency with which an interval repeatedly occurs between adjacent instances of the predetermined synchronization signal; and a signal processing section for subjecting the input signal to a signal processing which is suitable for the determined input signal type.

10 Claims, 16 Drawing Sheets

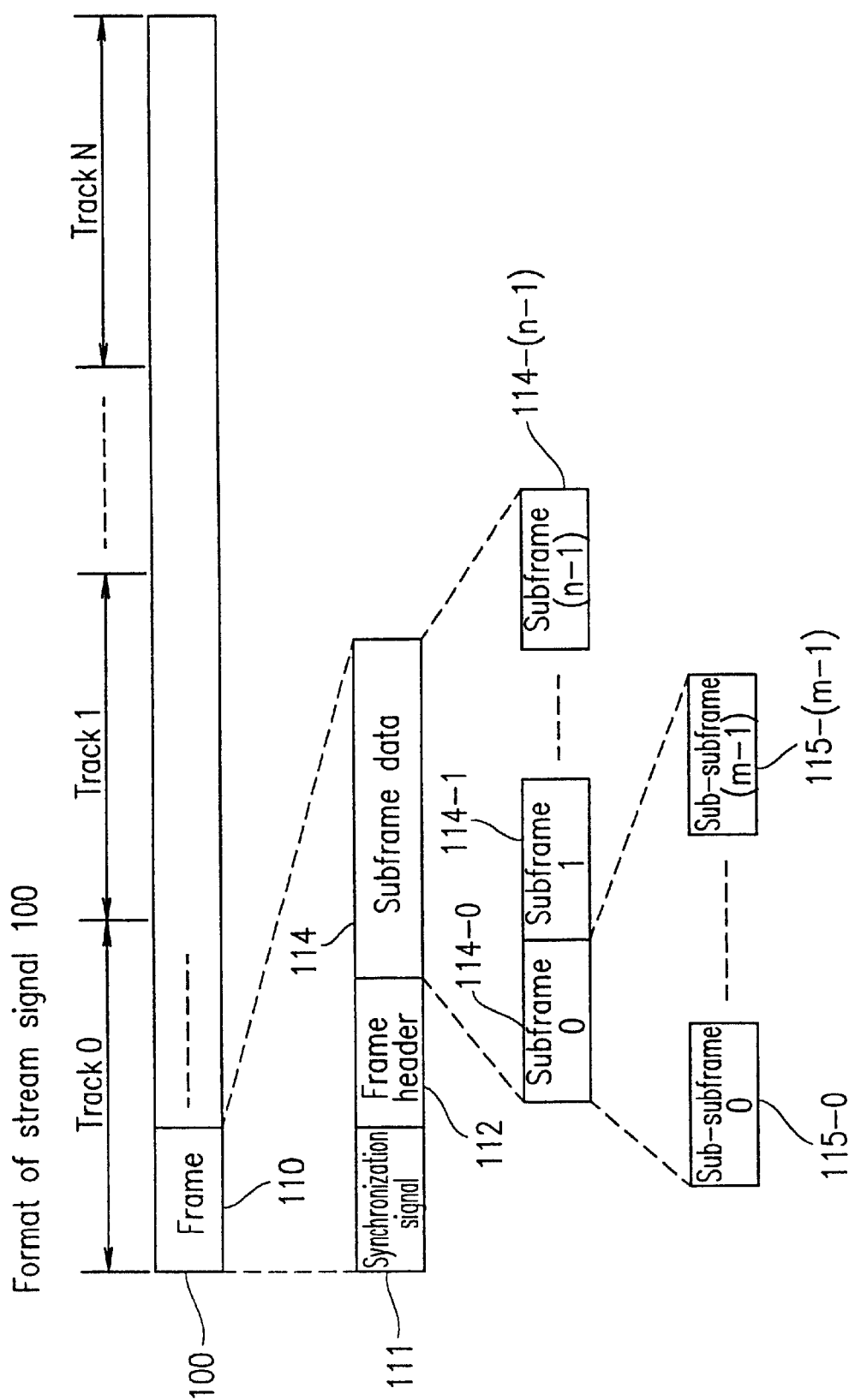

*FIG.4B*

| Address table 24a |
|---|
| 0 |
| 4096 |
| 8192 |
| 9192 |
| 12288 |
| 16384 |
| 20280 |
| 20480 |
| 24576 |
| 28872 |

| Address interval table 24b |
|---|
| 4096 |
| 4096 |
| 1000 |
| 3096 |
| 4096 |
| 3896 |
| 200 |
| 4096 |
| 4096 |

24

REPRODUCTION APPARATUS AND REPRODUCTION METHOD

BACKGROUND OF THE INVENTION

1. Field of the Invention

The present invention relates to a reproduction apparatus and a reproduction method for reproducing a digital audio signal and an encoded stream signal which are recorded on a recording medium.

2. Description of the Related Art

Conventionally, a digital audio signal which is recorded on recording media such as CDs (compact disks) and DATs (digital audio tapes) is recorded in accordance with a 2 cH/16 bit/PCM recording method. Hereinafter, any digital audio signal which has been recorded in accordance with this recording method will be referred to as a "PCM digital audio signal".

In recent years, techniques for recording digital audio signals on a recording medium such as a CD or DAT, where the digital audio signals are encoded in accordance with a predetermined encoding method, have been developed. Hereinafter, any digital audio signal which has been encoded in accordance with a predetermined encoding method will be referred to as a "stream signal". One known example of such a predetermined encoding method is DTS (digital theater system).

DTS is a standard proposed by Digital Theater Systems, Inc. in the U.S. According to DTS, a multichannel signal of up to 5.1 ch can be encoded at a fixed rate of 1.411 Mbps, which is equal to the bit rate for 2 ch/PCM data to be recorded on a CD. The resultant encoded signal is recorded on a CD. Hereinafter, any stream signal which has been encoded in accordance with DTS will be referred to as a "DTS stream signal".

In the case where a PCM digital audio signal is recorded on a CD, the signal recorded on the CD can be reproduced by subjecting the PCM digital audio signal to a D/A (digital to audio) conversion. On the other hand, in the case where a stream signal is recorded on a CD, the stream signal must first be decoded and then subjected to D/A conversion; otherwise, the signal recorded on the CD cannot be reproduced.

Conventionally, it has been impossible to determine whether a signal which is recorded on a CD is a stream signal or a PCM digital audio signal without decoding the signal recorded on the CD. Therefore, there has been a problem in that an undecoded stream signal may be subjected to D/A conversion resulting in unwanted noise being output from the reproduction apparatus.

The aforementioned noise will not be output in the case where the reproduction apparatus includes an internal decoder for decoding a signal which is recorded on a CD, because any stream signal will be decoded by the decoder before being subjected to D/A conversion. However, substantial resources are required to implement such a decoder, resulting in an increase in the cost associated with the reproduction apparatus having an internal decoder.

SUMMARY OF THE INVENTION

A reproduction apparatus according to the present invention includes: a signal input section for receiving an input signal having an input signal type; a synchronization signal detection section for detecting a predetermined synchronization signal in the input signal and determining the input signal type in accordance with an occurrence frequency with which an interval repeatedly occurs between adjacent instances of the predetermined synchronization signal; and a signal processing section for subjecting the input signal to a signal processing which is suitable for the determined input signal type.

In one embodiment of the invention, the synchronization signal detection section determines whether or not the input signal is a stream signal containing the predetermined synchronization signal, and if the input signal is a stream signal, the signal processing section performs a signal processing for suppressing a signal level of the input signal.

In another embodiment of the invention, the synchronization signal detection section determines whether or not the input signal is a stream signal containing the predetermined synchronization signal, and if the input signal is not a stream signal, the signal processing section performs a signal processing for boosting a signal level of the input signal.

In still another embodiment of the invention, the synchronization signal detection section includes: a data counter for counting a data amount in the input signal and outputting an address in the input signal; a synchronization signal detector for detecting the predetermined synchronization signal in the input signal and outputting a detection signal representing a result of the detection; an address storage section for storing a plurality of addresses output from the data counter in an address table in response to the detection signal; and an address analysis section for calculating an address interval between adjacent addresses among the plurality of addresses stored in the address table and calculating an occurrence frequency of the address interval, and determining the input signal type based on the calculated occurrence frequency of the address interval.

In still another embodiment of the invention, the address storage section deletes from the address table any past addresses which go back in an address history beyond a predetermined range from a current address.

In still another embodiment of the invention, the predetermined range is set in a variable manner.

In still another embodiment of the invention, in a case where a limited variety of the address interval is previously known to have a possibility of occurring, the address analysis section determines the input signal type in accordance with the occurrence frequencies with which the limited variety of the address interval occurs.

In still another embodiment of the invention, the reproduction apparatus further includes an input section controller for controlling the signal input section so as to read the input signal from a predetermined read position, and a host controller for controlling the input section controller and the signal processing section, wherein: the signal input section reads the input signal ahead from a predetermined position which is beyond a predetermined region from the beginning of the input signal: when the input signal is read from the predetermined position, the host controller places the signal processing section under a default control; the synchronization signal detection section determines the input signal type based on the input signal as read from the predetermined position; the signal input section reads the input signal from the beginning of the input signal after the input signal type has been determined; and the host controller controls the signal processing section so as to subject the input signal to a signal processing which is suitable for the determined input signal type.

In still another embodiment of the invention, the reproduction apparatus further includes an input buffer for temporarily storing the input signal, wherein the synchronization signal detection section detects the predetermined synchronization signal in the input signal stored in the input buffer.

A reproduction method according to the present invention includes the steps of: receiving an input signal having an input signal type; detecting a predetermined synchronization signal in the input signal and determining the input signal type in accordance with an occurrence frequency with which an interval repeatedly occurs between adjacent instances of the predetermined synchronization signal; and subjecting the input signal to a signal processing which is suitable for the determined input signal type.

Thus, the invention described herein makes possible the advantage of providing a reproduction apparatus and a reproduction method which make it possible to identify an input signal type without decoding the input signal, thereby reducing noise in the reproduced signal.

This and other advantages of the present invention will become apparent to those skilled in the art upon reading and understanding the following detailed description with reference to the accompanying figures.

BRIEF DESCRIPTION OF THE DRAWINGS

FIG. 2A is a diagram illustrating a format of a stream signal 100.

FIG. 4B is a diagram illustrating a particular example of a plurality of addresses stored in an address table 24a, and a particular example of a plurality of address intervals stored in an address interval table 24b.

FIG. 9 is a block diagram illustrating a structure of a synchronization signal detection section 20a.

DESCRIPTION OF THE PREFERRED EMBODIMENTS

Hereinafter, the present invention will be described by way of examples, with reference to the accompanying figures.

EXAMPLE 1

Figure 1:
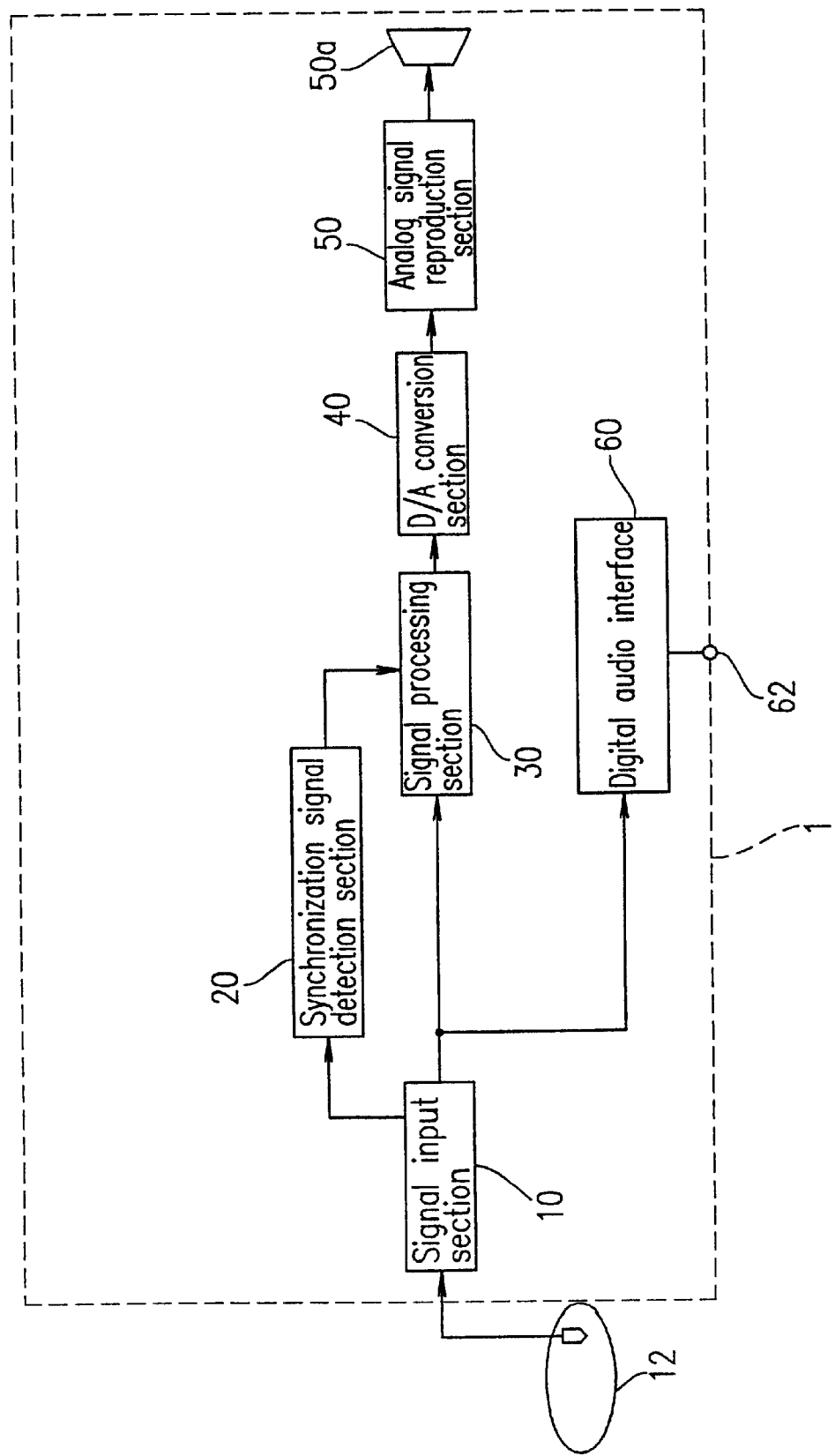
FIG. 1 is a block diagram illustrating a structure of a reproduction apparatus 1 according to Example 1 of the present invention.

FIG. 1 is a block diagram illustrating a structure of a reproduction apparatus 1 according to Example 1 of the present invention. A signal which is read from a recording medium 12 is input to the reproduction apparatus 1 as an input signal. Typically, the recording medium 12 is a CD. The recording medium 12 may alternatively be a DAT.

In the following description, it is assumed that the input signal which is input to the reproduction apparatus 1 is either a stream signal 100 or a PCM digital audio signal 200. However, the input signal which is input to the reproduction apparatus 1 according to the present invention is not limited to these two specific types of signals. In principle, the method according to the present invention monitors the intervals between multiple instances of a predetermined synchronization signal which is detectable in each input signal supplied to the reproduction apparatus 1. Accordingly, the present invention can be suitably used for any type of input signal that can be distinguished from another input signal on the basis of a numbers of times (or "frequency") a given interval repeatedly occurs between adjacent instances of a predetermined synchronization signal in each input signal.

FIG. 2A is a diagram illustrating a format of a stream signal 100. In the example illustrated in FIG. 2A, it is assumed that the stream signal 100 is a DTS stream signal.

The stream signal 100 is recorded on a plurality of tracks provided on the recording medium 12 (e.g., track 0, track 1, . . . , and track N). Herein, N may be any integer.

The stream signal 100 includes a plurality of frames' 110. Each of the plurality of frames 110 includes a synchronization signal 111, a frame header 112, and a subframe data 114.

In the case where the stream signal 100 is a DTS stream signal, the synchronization signal 111 is 32-bit data. The synchronization signal 111 has a value "0x7ffe8001". Alternatively, the synchronization signal 111 may have a value "0x1fffe800".

The subframe data 114 is a digital audio signal which is encoded in accordance with DTS. The subframe data 114 includes a number n of subframes 114-0 to 114-(n–1) (i.s., subframe 0 to subframe (n–1)), where n is an integer which is equal to or less than 32. Each of the subframes 114-0 to 114-(n–1) includes a number m of sub-subframes 115-0 to 115-(m–1) (i.e., sub-subframe 0 to sub-subframe (m–1)), where m is an integer which is equal to or less than 4.

Figure 2B:
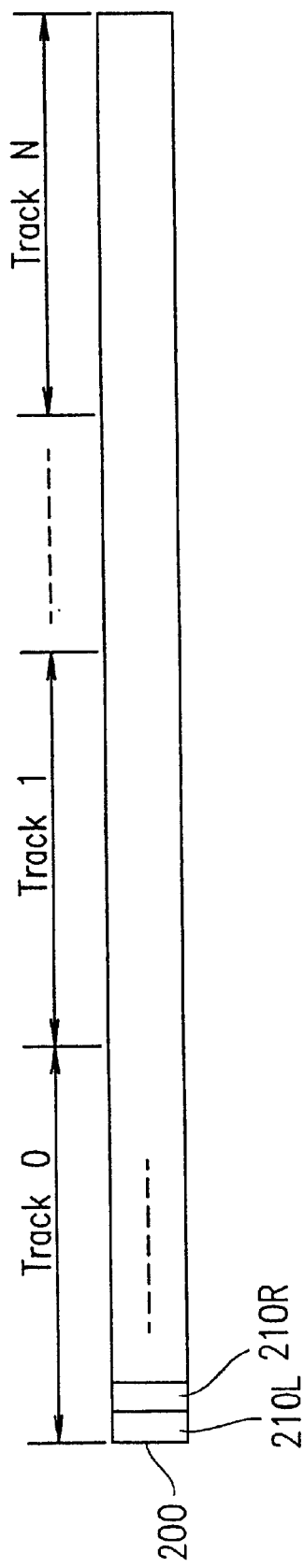
FIG. 2B is a diagram illustrating a format of a PCM digital audio signal 200.

FIG. 2B is a diagram illustrating a format of a PCM digital audio signal 200.

The PCM digital audio signal 200 is recorded on a plurality of tracks provided on the recording medium 12 (e.g., track 0, track 1, . . . , and track N). Herein, N may be any integer.

The PCM digital audio signal 200 includes an alternate arrangement of signals 210L for the left channel and signals 210R for the right channel.

Referring back to FIG. 1, the reproduction apparatus 1 includes: a signal input section 10 for receiving an input signal; a synchronization signal detection section 20 for detecting a predetermined synchronization signal in the input signal and determining the input signal type on the basis of the frequency with which a given interval repeatedly occurs between adjacent instances of the predetermined synchronization signal; and a signal processing section 30 for subjecting the input signal to signal processing which is suitable for the input signal type as determined by the synchronization signal detection section 20.

The synchronization signal detection section 20 determines whether or not the frequency with which a given interval repeatedly occurs between adjacent instances of the predetermined synchronization signal exceeds a predetermined threshold. If the frequency with which a given interval repeatedly occurs between adjacent instances of the predetermined synchronization signal exceeds the predetermined threshold, then the synchronization signal detection section 20 determines that the input signal is a stream signal 100; otherwise, the synchronization signal detection section 20 determines that the input signal is a PCM digital audio signal 200. The synchronization signal detection section 20 outputs a detection signal indicating the input signal type to the signal processing section 30. For example, if the input signal is a stream signal 100, then the synchronization signal detection section 20 may output a detection signal having a value "1" to the signal processing section 30, and if the input signal is a PCM digital audio signal 200, then the synchronization signal detection section 20 may output a detection signal having a value "0" to the signal processing section 30.

The detection result by the synchronization signal detection section 20 may be informed to a user of the reproduction apparatus 1 by various methods. For example, a stream signal indicator may be displayed on, e.g., a liquid crystal panel (not shown) which may be included in the reproduction apparatus 1 to indicate that the input signal is a stream signal 100, whereas a PCM indicator may be displayed on the liquid crystal panel of the reproduction apparatus 1 to indicate that the input signal is a PCM digital audio signal 200. Alternatively, in order to indicate that a stream signal 100 has been input to the reproduction apparatus 1, a voice may be reproduced which says "A stream signal cannot be reproduced on this reproduction apparatus. Please connect an external receiver to the external terminal for digital audio interface", for example.

The signal processing section 30 is operative to output the input signal to a D/A conversion section 40 if the input signal is a PCM digital audio signal 200, and to prevent the input signal from being output to the D/A conversion section 40 if the input signal is a stream signal 100. For example, if the input signal is a stream signal 100, the signal processing section 30 may reduce the signal level of the input signal to zero, or change the pathway for the input signal so that the input signal is not output to the D/A conversion section 40.

Alternatively, if the input signal is a stream signal 100, the signal processing section 30 may suppress the signal level of the input signal and output the input signal with a suppressed signal level to the D/A conversion section 40.

Thus, the signal processing section 30 operates so as to prevent a stream signal 100 from being output to the D/A conversion section 40 without being decoded, or suppress the signal level of the stream signal 100. As a result, noise in the reproduced signal from the reproduction apparatus 1 can be eliminated or suppressed.

Alternatively, the level of the output signal from the signal processing section 30 may be prescribed to be zero (or a suppressed value) by default, and the level of the output signal from the signal processing section 30 may be amplified only if the input signal is determined to be a PCM digital audio signal 200. Such a control scheme would also ensure that noise in the reproduced signal from the reproduction apparatus 1 is eliminated or suppressed.

The digital signal which is output from the signal processing section 30 is converted by the D/A conversion section 40 into an analog signal. The analog signal which is output from the D/A conversion section 40 is output by an output device 50a (e.g., a loudspeaker) via an analog signal reproduction section 50.

The input signal which is output from the signal input section 10 is also supplied to a digital audio interface 60. The digital audio interface 60 converts an input signal into a digital signal of a predetermined format (e.g., IEC (International Electrotechnical Commission) 958 format), and outputs the resultant digital signal to an external device coupled to the reproduction apparatus 1 via an external terminal 62. As the digital audio interface 60, a SPDIF (Sony-Philips Digital Interface), for example, may be adopted. An external receiver (not shown) having an internal decoder which is capable of decoding an input signal may be coupled to the external terminal 62.

By decoding the input signal by means of the internal decoder in the external receiver, it is possible to determine whether the input signal is a stream signal 100 or a PCM digital audio signal 200. If the input signal is a stream signal 100, the input signal is first decoded and then subjected to D/A conversion in the external receiver. If the input signal is a PCM digital audio signal 200, the input signal is subjected to D/A conversion in the external receiver.

Thus, by subjecting an input signal to appropriate processing in accordance with the input signal type, the signal output from the digital audio interface 60 can be properly reproduced.

The respective elements shown in FIG. 1 may be implemented by hardware means (e.g., circuits), or software means (e.g., programs). Alternatively, the respective elements shown in FIG. 1 may be implemented by a combination of hardware means and software means.

Figure 3:
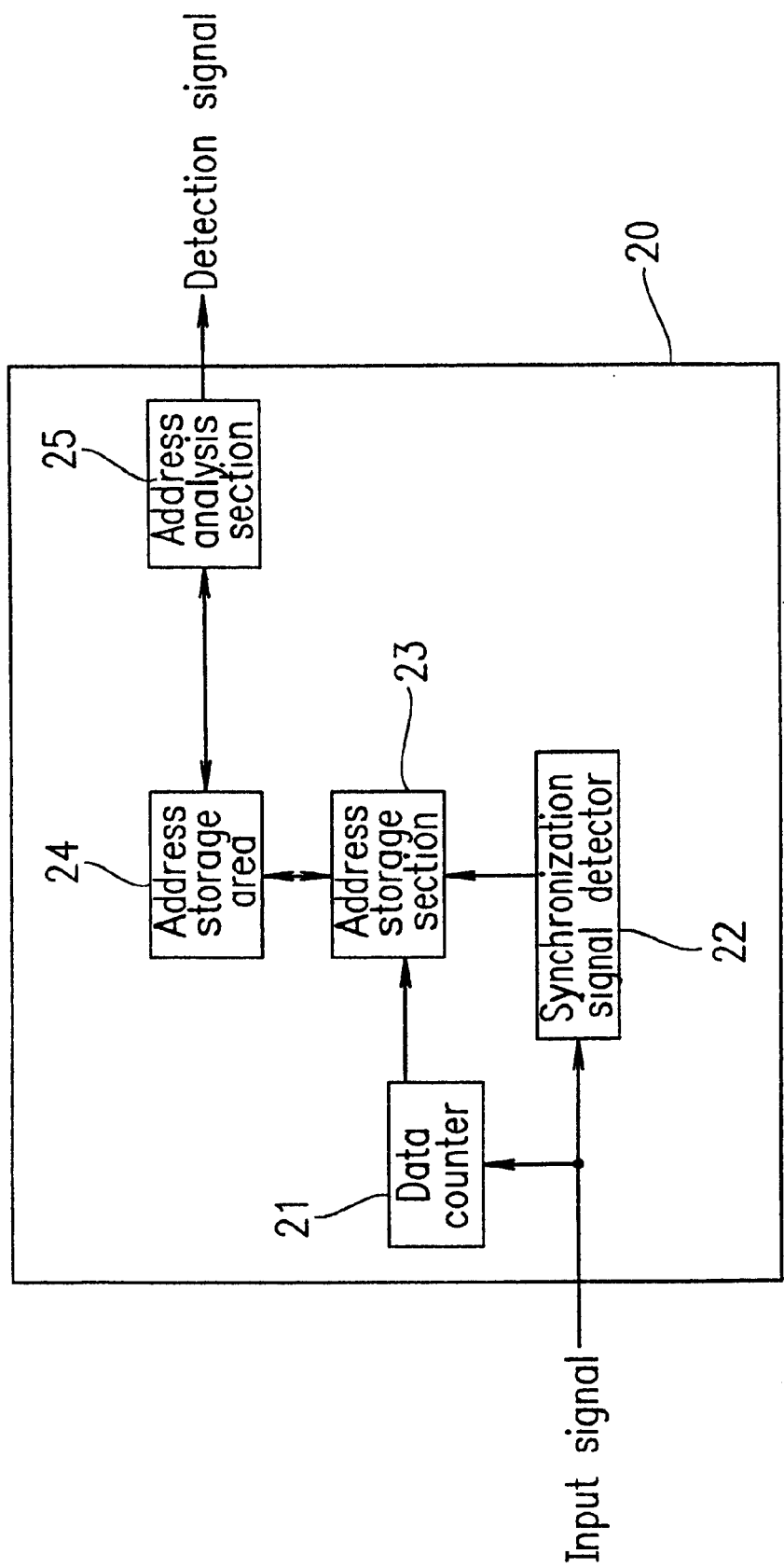
FIG. 3 is a block diagram illustrating a structure of a synchronization signal detection section 20.

FIG. 3 is a block diagram illustrating a structure of the synchronization signal detection section 20. The synchronization signal detection section 20 includes a data counter 21, a synchronization signal detector 22, an address storage section 23, an address storage area 24, and an address analysis section 25.

An input signal is input, one byte at a time, to the data counter 21 and the synchronization signal detector 22. The byte unit of the input signal which is input to the data counter 21 and the synchronization signal detector 22 may be arbitrarily selected (e.g., one byte unit, two byte units, or four byte units). In the present example, it is assumed that the byte unit of the input signal is one.

The data counter 21 counts the number of bytes in the input signal, and outputs to the address storage section 23 an address indicating the number of bytes which have been counted up to the current 1-byte data from the beginning of the input signal.

The synchronization signal detector 22 determines whether or not the past 4 bytes of data, including the current 1-byte data, are identical to a predetermined synchronization signal pattern. If the past 4 bytes of data are identical to the predetermined synchronization signal pattern, then the synchronization signal detector 22 outputs a detection signal indicating a "match" to the address storage section 23. If the past 4 bytes of data are not identical to the predetermined synchronization signal pattern, then the synchronization signal detector 22 outputs a detection signal indicating a "non-match" to the address storage section 23.

In the present example, it is assumed that the predetermined synchronization signal pattern is either "0x7ffe8001" or "0x1fffe800". If the past 4 bytes of data are identical to at least one of "0x7ffe8001" and "0x1fffe800", then a detection signal indicating a "match" is output to the address storage section 23. If the past 4 bytes of data are not identical to either "0x7ffe8001" or "0x1fffe800", then a detection signal indicating a "non-match" is output to the address storage section 23.

In response to a detection signal indicating a "match", the address storage section 23 stores an address output from the data counter 21 in the address storage area 24.

Figure 4A:
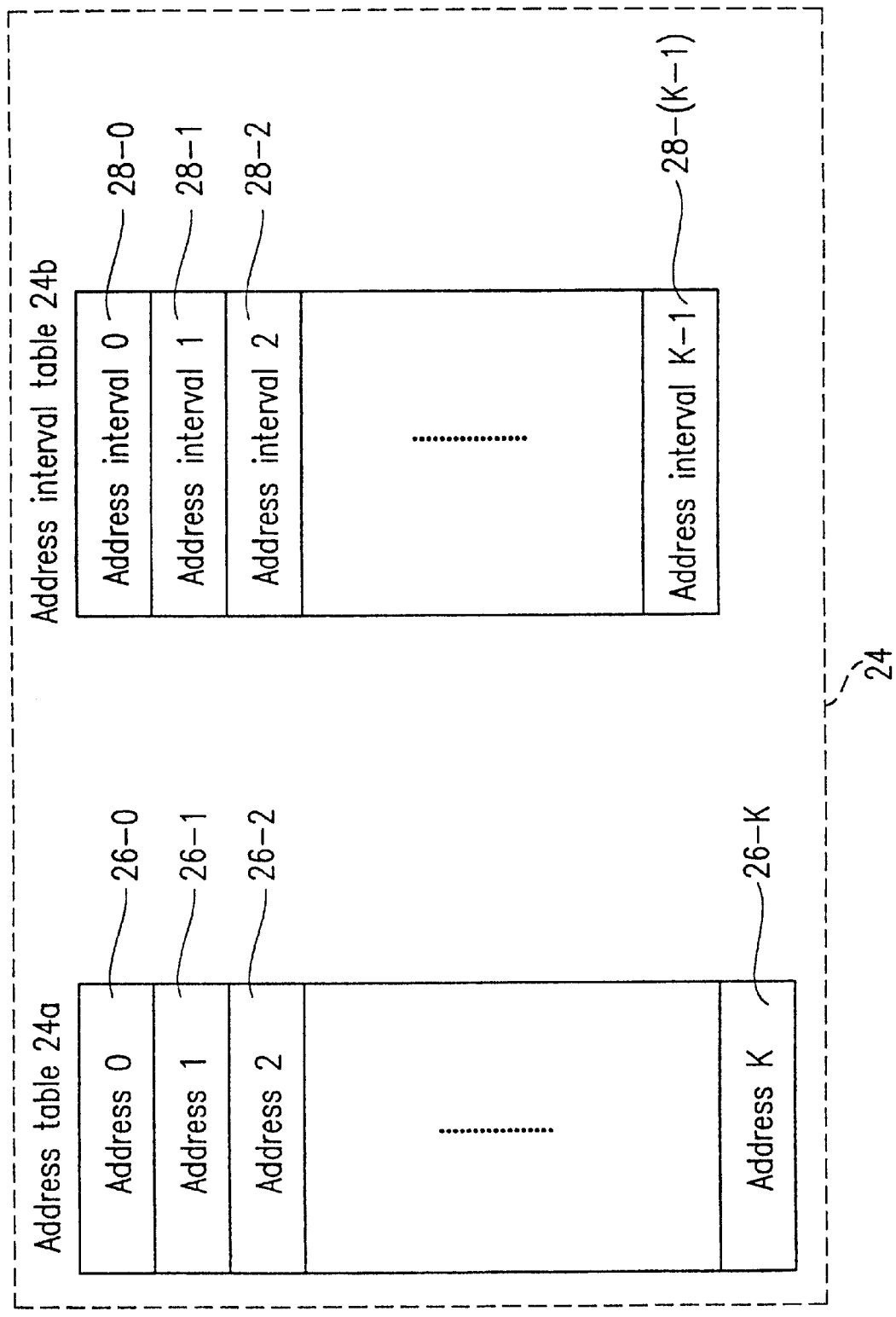
FIG. 4A is a diagram illustrating a structure of an address storage area 24.

FIG. 4A shows a structure of the address storage area 24. The address storage area 24 includes an address table 24a and an address interval table 24b.

The address table 24a is arranged so as to accommodate a plurality of addresses which are output from the address storage section 23. In the example shown in FIG. 4A, the address table 24a has a number (K+1) entries 26-0 to 26-K for storing addresses 0 to K, respectively. By referring to the address table 24a, it is possible to know a history of addresses which have been output from the address storage section 23.

In order to prevent a current address from overwriting any past address stored in the address table 24a, the position of a pointer which points to a position in which to write an address is updated every time an address is written to the address table 24a.

The address storage section 23 deletes from the address table 24a any past addresses that go back in the address history beyond a predetermined range from the current address. The predetermined range may be designed to be an arbitrarily selected length. For example, the predetermined range may have a length which is equal to or greater than four times the maximum frame length for any stream signal that may be input.

The greater the length of the predetermined range is, the longer the history of past addresses retained in the address table 24a, which makes for a more accurate determination of the input signal type, even if the input signal includes an error, for example. However, there are disadvantages associated with a long predetermined range; that is, as the predetermined range becomes longer, a larger storage area will be required for the address table 24a, and the detection of changing input signal types will take more time.

Therefore, in practice, an appropriate length is prescribed for the predetermined range in view of the aforementioned disadvantages of a long predetermined range. According to the present example, the length of the predetermined range is prescribed to be a length corresponding to 32 entries on the address table 24a.

The address analysis section 25 (FIG. 3) calculates the interval between each adjacent pair of addresses among a plurality of addresses stored in the address table 24a, and stores the calculated interval (hereinafter referred to as the "address interval") in the address interval table 24b. Each address interval represents an interval between adjacent instances of a predetermined synchronization signal included in a given input signal.

The address interval table 24b is arranged so as to accommodate a plurality of address intervals which are calculated by the address analysis section 25. In the example shown in FIG. 4A, the address interval table 24b has a number K of entries 28-0 to 28-(K−1) for storing address intervals 0 to (K−1), respectively.

Based on the plurality of address intervals stored in the address interval table 24b, the address analysis section 25 calculates the number of times ("occurrence frequency") each one of the plurality of address intervals occurs, and determines whether or not the occurrence frequency of each address interval has exceeded a predetermined threshold value.

If the occurrence frequency of at least one of the plurality of address intervals has exceeded the predetermined threshold value, the address analysis section 25 outputs a detection signal indicating that the input signal is a stream signal. If the occurrence frequency of none of the plurality of address intervals has exceeded the predetermined threshold value, the address analysis section 25 outputs a detection signal indicating that the input signal is a PCM digital audio signal.

FIG. 4B is a diagram illustrating a particular example of a plurality of addresses stored in the address table 24a, and a particular example of a plurality of address intervals stored in the address interval table 24b.

As a result of calculating the interval between each adjacent pair of adjacent addresses among the plurality of addresses stored in the address table 24a, address intervals "4096", "4096", "1000", "3096", "4096", "3896", "200", "4096", and "4096" are respectively obtained. These address intervals are stored in the respective entries of the address interval table 24b.

Next, the occurrence frequency of each of the address intervals "200", "1000", "3096", "3896", and "4096" is calculated. In the example illustrated in FIG. 4B, the occurrence frequency of address interval "200" is 1; the occurrence frequency of address interval "1000" is 1; the occurrence frequency of address interval "3096" is 1; the occurrence frequency of address interval "3896" is 1; and the occurrence frequency of address interval "4096" is 5. Assuming that the predetermined threshold value is "3", the predetermined threshold value ("3") is exceeded by the occurrence frequency ("5") of the address interval "4096". As a result, a detection signal indicating that the input signal is a stream signal is output.

The reason why the predetermined threshold value is assumed to be "3" in this example is that any address intervals which only have an occurrence frequency of one or two may be due to an irrelevant pattern in the input signal which happens to be identical to a predetermined synchronization signal, in which case it is difficult to determine the input signal as a stream signal.

The predetermined threshold value ($T_H$) which each address interval is compared against and the predetermined range (R) of addresses to be stored in the address table 24a should satisfy the relationship expressed by eq. 1:

$$R \geq F_{max} * (T_H + 1)$$ eq. 1, where $F_{max}$ represents the maximum frame length for any stream signal that may be input.

In the case where there is a high likelihood that an irrelevant pattern which is identical to a predetermined synchronization signal may appear in the input signal, it is preferable to prescribe the predetermined threshold value to a higher value in order to ensure a more accurate determination of a given input signal type.

In the case where a limited variety of address intervals is known to have the possibility of occurring, it is preferable that the address analysis section 25 determines the input signal type in accordance with the occurrence frequencies with which such address intervals repeatedly occur. For example, if the input stream signal is known to have a fixed frame length, then the address analysis section 25 is preferably arranged so as not to calculate the occurrence frequencies of any address intervals which do not have that fixed frame length. As a result, the chances of incorrectly determining the input signal type based on the wrong address interval can be reduced.

A sub-subframe of a DTS stream signal contains data spanning a period of time corresponding to 256 samples of audio data. A data length $D_L$ of a sub-subframe can be calculated in accordance with eq. 2:

$$D_L=256\ [sample]*2\ [ch]\ 2\ [byte]=1024\ [byte] \qquad \text{eq. 2.}$$

A frame length $F_L$ of a DTS stream signal can be calculated in accordance with eq. 3:

$$F_L=(number\ of\ sub\text{-}subframes)*(number\ of\ subframes)*1024 \text{ eq. 3.}$$

From eq. 3, it can be seen that the frame length $F_L$ of a DTS stream signal will be a multiple of 1024. Accordingly, the occurrence frequency of any address intervals that are not multiples of 1024 can be precluded from the process performed by the address analysis section 25 of determining an address interval having an occurrence frequency exceeding the predetermined threshold value among a plurality of address intervals. As a result, the chances of incorrectly determining the input signal type can be reduced.

In the case where a number L of types of predetermined synchronization signals are subject to detection, the address storage area 24 needs to contain L address tables 24a and L address interval tables 24b because an address table 24a and an address interval table 24b are required for each type of predetermined synchronization signal. Noting that L=2 in the present example, the address storage area 24 is required to contain two address tables 24a and two address interval tables 24b.

FIGS. 5A to 5F each illustrate a specific example of an input signal whose input signal type is likely to be incorrectly determined.

Figure 5A:
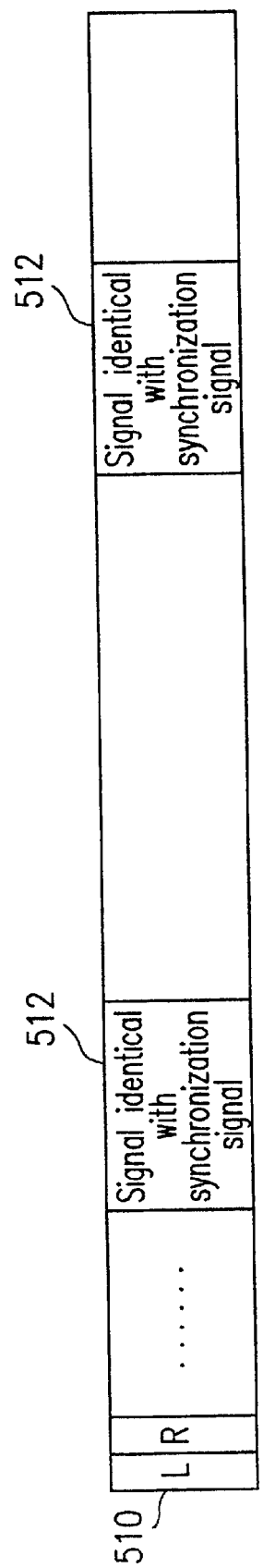
FIG. 5A is a diagram illustrating a specific example of an input signal whose input signal type is likely to be incorrectly determined.

FIG. 5A illustrates a specific example of a PCM digital audio signal 510 containing a signal 512 which happens to be identical to a predetermined synchronization signal contained in a stream signal. When the PCM digital audio signal 510 shown in FIG. 5A is input to the reproduction apparatus 1, an address interval between the two illustrated instances of the signal 512 will be stored in the address interval table 24b. However, it is very unlikely for the same address interval as this particular address interval to occur a plurality of times. Therefore, it is possible to correctly determine this input signal as a PCM digital audio signal by comparing the occurrence frequency of the address intervals against a predetermined threshold value.

Figure 5B:
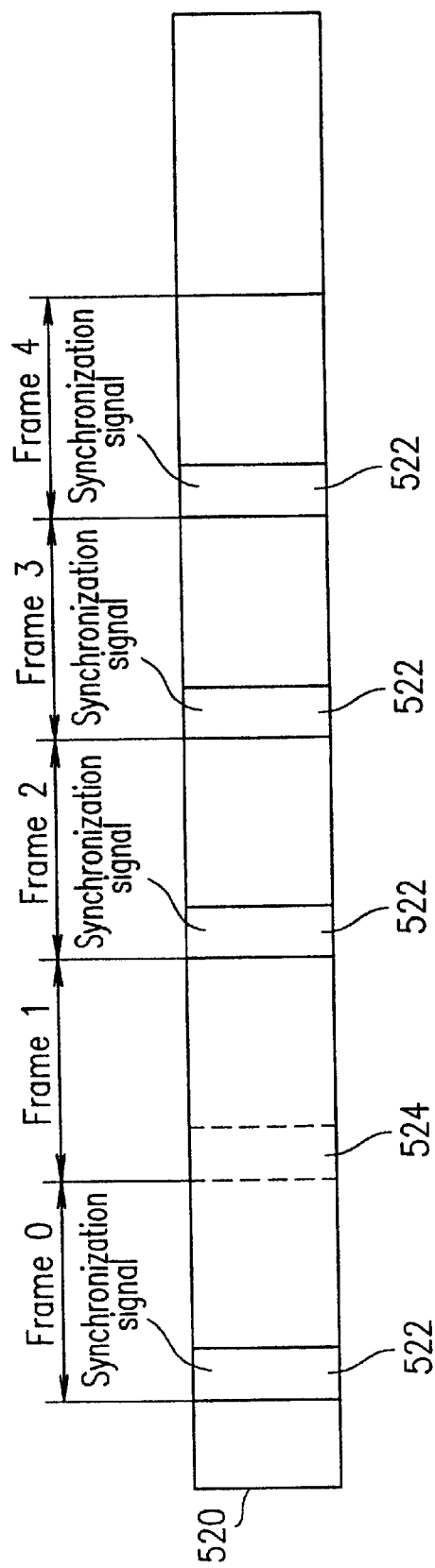
FIG. 5B is a diagram illustrating another specific example of an input signal whose input signal type is likely to be incorrectly determined.

FIG. 5B illustrates a specific example of a stream signal 520 containing an unrecognizable synchronization signal 524. Such an unrecognizable synchronization signal 524 may be produced as a result of losing portions of the synchronization signal through transfer errors, for example. In this case, too, it is possible to correctly determine this input signal as a stream signal by detecting the synchronization signal 522. This is because the input signal type is determined not on the basis of continuity in the synchronization signal but on the occurrence frequency of intervals between instances of the synchronization signal.

Figure 5C:
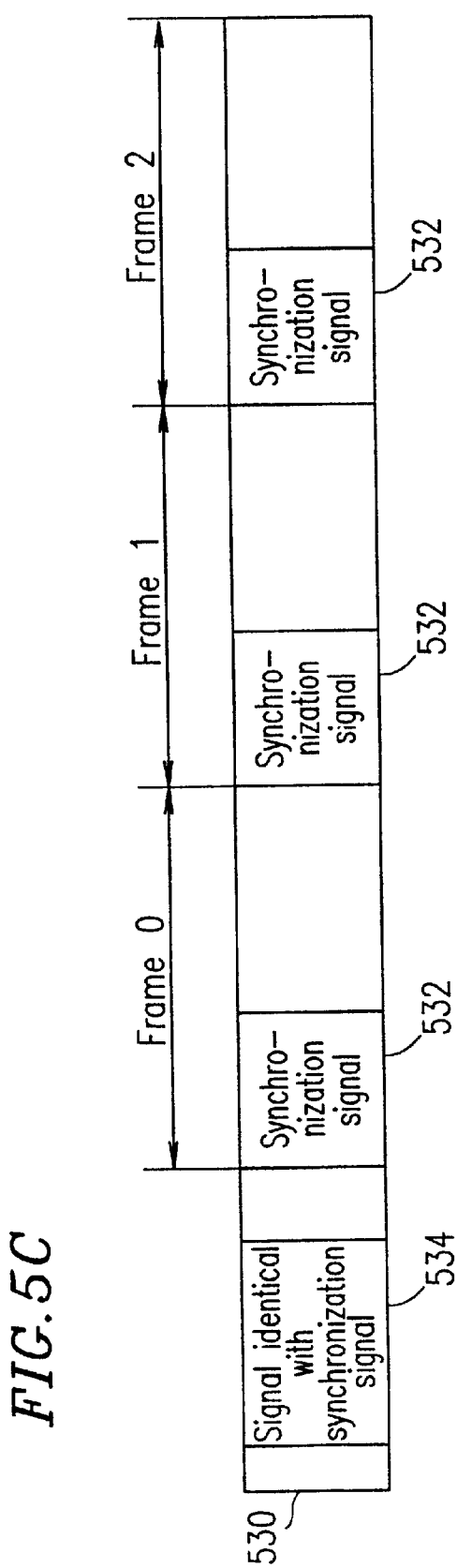
FIG. 5C is a diagram illustrating another specific example of an input signal whose input signal type is likely to be incorrectly determined.

FIG. 5C illustrates a specific example of a stream signal 530 containing a signal 534 which slipped in as a partial frame and which happens to be identical to a synchronization signal 532. As in the case illustrated in FIG. 5B, it is possible to correctly determine this input signal as a stream signal by detecting the synchronization signal 532. This is because the input signal type is determined not on the basis of continuity in the synchronization signal but on the occurrence frequency of intervals between instances of the synchronization signal.

Figure 5D:
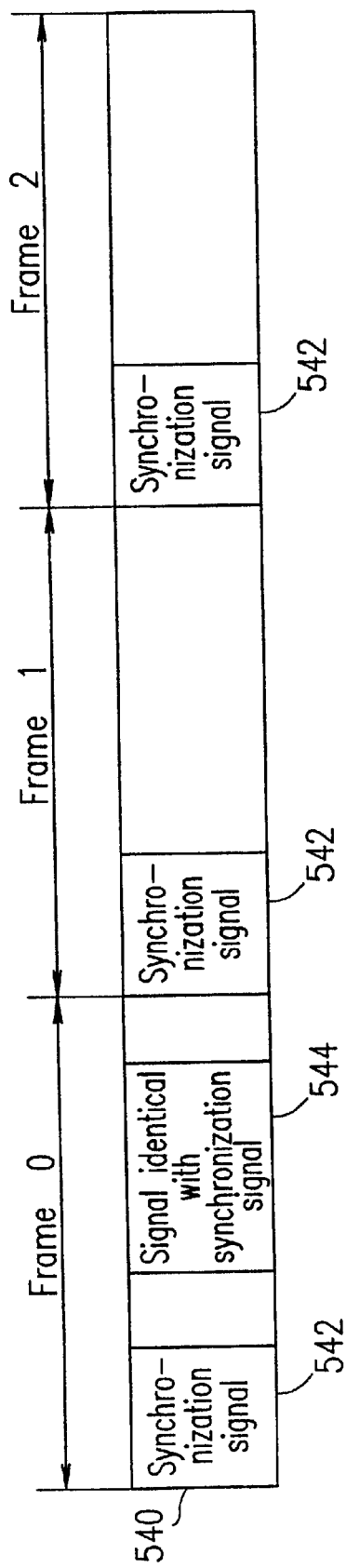
FIG. 5D is a diagram illustrating another specific example of an input signal whose input signal type is likely to be incorrectly determined.

FIG. 5D illustrates a specific example of a stream signal 540 containing a signal 544 which happens to be identical to a synchronization signal 542, the signal 544 occurring between two instances of the synchronization signal 542. When the stream signal 540 shown in FIG. 5D is input to the reproduction apparatus 1, an address interval between the earlier instance of the signal 542 and the signal 544 and an address interval between the signal 544 and the later instance of the signal 542 will be stored in the address interval table 24b; thus, the address intervals between the detected instances of the synchronization signal become somewhat irregular. However, it is very unlikely for the same address interval as these particular address intervals to occur a plurality of times. Therefore, it is possible to correctly determine this input signal as a stream signal by comparing the occurrence frequency of the address intervals against a predetermined threshold value.

Figure 5E:
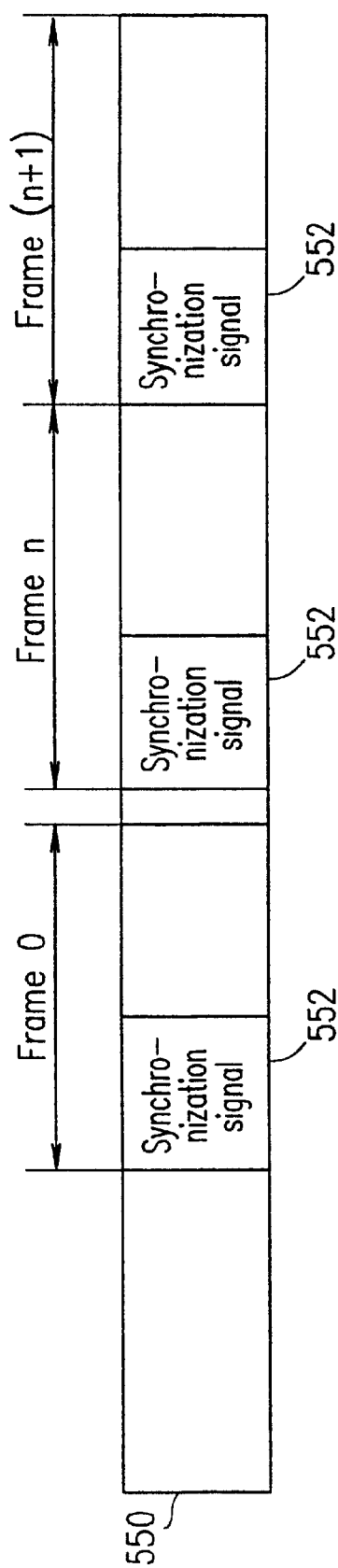
FIG. 5E is a diagram illustrating another specific example of an input signal whose input signal type is likely to be incorrectly determined.

FIG. 5E illustrates a specific example of a stream signal 550 containing a discontinuous link. As in the case illustrated in FIG. 5B, it is possible to correctly determine this input signal as a stream signal by detecting the synchronization signal 552. This is because the input signal type is determined not on the basis of continuity in the synchronization signal but on the occurrence frequency of intervals between instances of the synchronization signal.

Figure 5F:
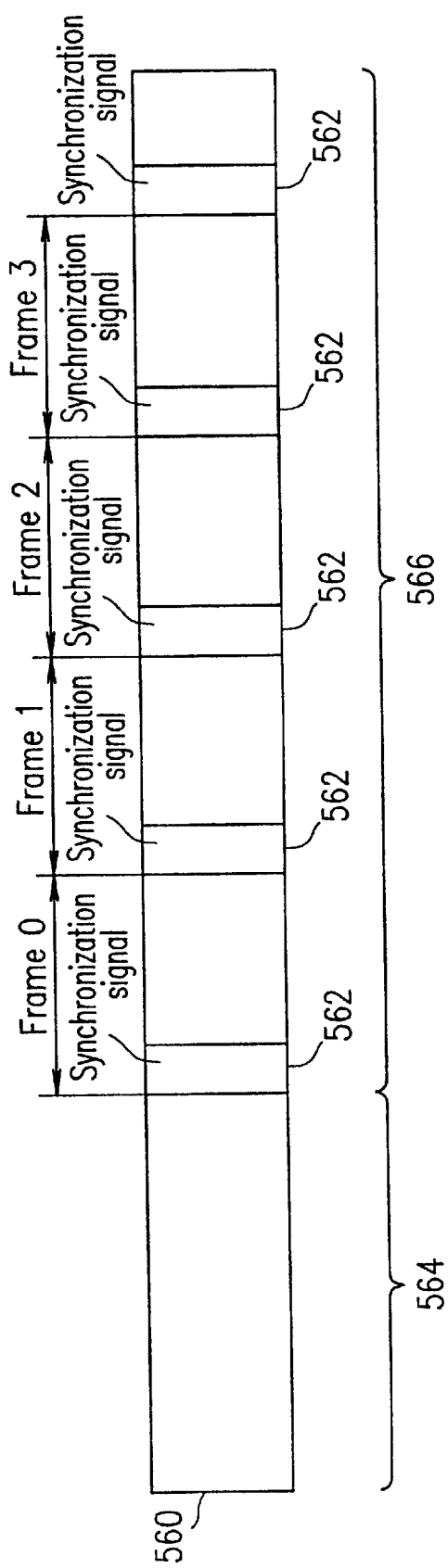
FIG. 5F is a diagram illustrating another specific example of an input signal whose input signal type is likely to be incorrectly determined.

FIG. 5F illustrates a specific example of an input signal 560 containing a PCM digital audio signal 564 and a stream signal 566 continuing from the PCM digital audio signal 564. Thus, the input signal 560 changes from the PCM digital audio signal 564 to the stream signal 566 at one point in its duration. In this case, there is no instance, or little of an instance, of a synchronization signal in the earlier portion of the input signal 560. Therefore, the earlier portion of the input signal 560 can be correctly determined as a PCM digital audio signal. On the other hand, the latter portion of the input signal 560 will be incorrectly determined as a PCM digital audio signal until the synchronization signal 562 is input for a third time with regular intervals; however, the remainder of the latter portion of the input signal 560 will be correctly determined as a stream signal as in any of the previously-illustrated examples. Thus, it is possible to correctly determine the type of an input signal even if both a PCM digital audio signal and a stream signal are contained in the input signal.

Note that it may take some time before the reproduction apparatus 1 according to Example 1 of the present invention can correctly determine the type of an input signal which changes from one type to another. Examples 2 and 3 below illustrate effective improvements in this respect.

EXAMPLE 2

Figure 6:
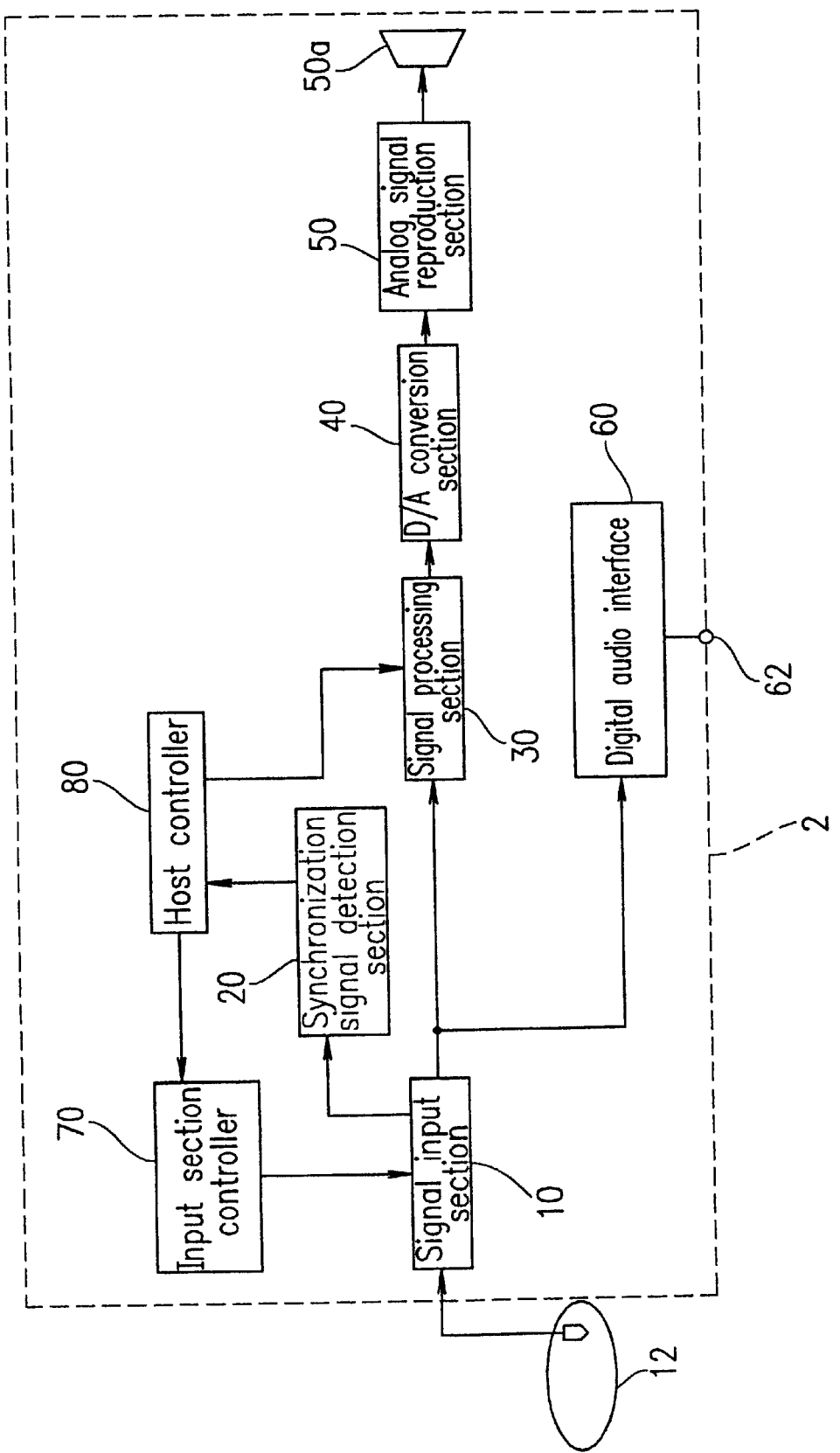
FIG. 6 is a block diagram illustrating a structure of a reproduction apparatus 2 according to Example 2 of the present invention.

FIG. 6 is a block diagram illustrating the structure of a reproduction apparatus 2 according to Example 2 of the present invention. The reproduction apparatus 2 includes an input section controller 70 and a host controller 80 in addition to the elements of the reproduction apparatus 1 illustrated in FIG. 1.

In FIG. 6, those constituent elements which also appear in FIG. 1 are denoted by the same reference numerals as those used therein, and thus description thereof is omitted hereafter.

A detection signal which is output from the synchronization signal detection section 20 is supplied to the host controller 80 rather than the signal processing section 30. A control signal which is output from the host controller 80 is supplied to the signal processing section 30.

The input section controller 70 realizes an address-based inputting of an input signal which is read from a recording medium 12. Specifically, the input controller 70 controls the signal input section 10 so as to read an input signal from a selected address.

Figure 7:
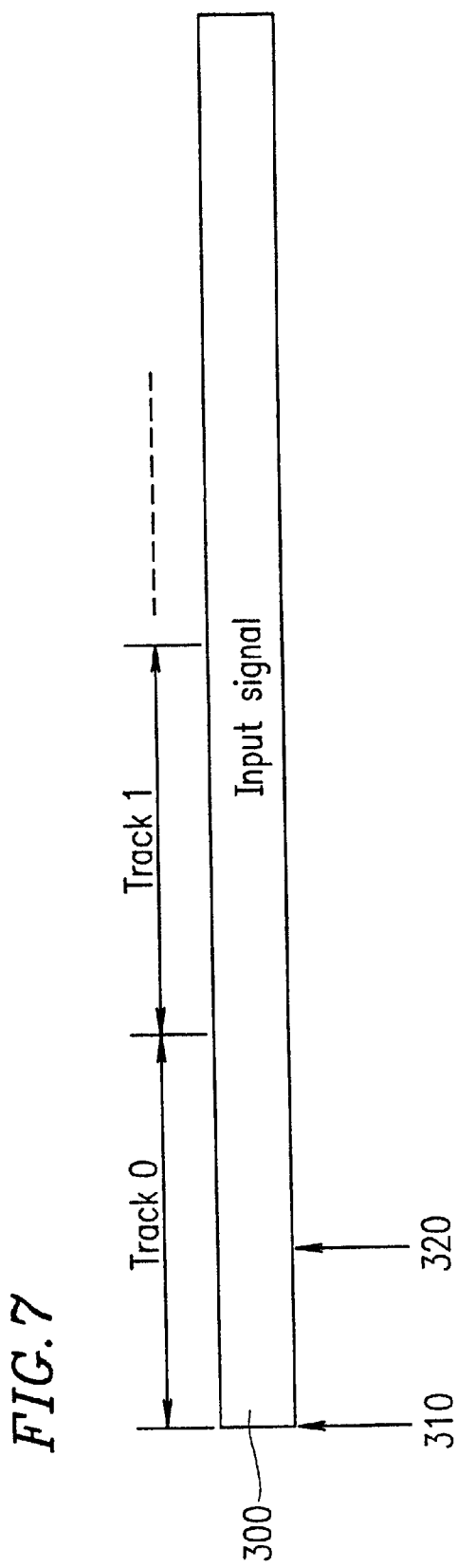
FIG. 7 is a diagram illustrating read positions in an input signal 300.

FIG. 7 is a diagram illustrating road positions in an input signal 300. These read positions are controlled by the input section controller 70.

Referring to FIG. 7, a read position 310 denotes the beginning of the input signal 300. The input section controller 70 controls the signal input section 10 so as to skip the reading of the input signal 300 within a predetermined region from the read position 310 and begin reading of the input signal 300 from a read position 320.

The read position 320 is previously set so that data contained in a track to be reproduced will be within a predetermined region from the read position 310. For example, in the case where a signal recorded on a CD is to be reproduced, the read position 320 is preferably set at a distance from the beginning of the track such that the distance is equal to or greater than the maximum frame length for any stream signal that may be input.

By setting the read position 320 in this manner, the chance of incorrectly determining the type of the input signal 300 due to reproducing any "garbage data" (i.e., data which is unrelated to the data in the track to be reproduced) that may be contained at the beginning of a track can be reduced. For example, in the case where a signal recorded on a CD is reproduced, the beginning of a given track may contain the data from a last portion of a previous track, and the beginning of the very first track may contain data which in itself is unrelated to the data of that track. Therefore, skipping the reading of the input signal 300 within a predetermined region from the beginning of a track is effective for preventing incorrect determination of the type of the input signal 300.

When the input signal 300 is read from the read position 320, the host controller 80 controls the signal processing section 30 in such a manner that any outputting from the signal processing section 30 is prohibited (or, in the alternative, the host controller 80 controls the signal level which is output from the signal processing section 30). By default, such control is performed when the input signal 300 is read from the read position 320 (hence such control will hereinafter be referred to as "default control").

In accordance with the detection signal which is output from the synchronization signal detection section 20, the host controller 80 determines whether the input signal 300 is a PCM digital audio signal or a stream signal. For example, the host controller 80 may monitor the detection signal which is output from the synchronization signal detection section 20 over a predetermined period of time, and if the number of times the input signal 300 is determined as a PCM digital audio signal during that period of time is greater than the number of times the input signal 300 is determined as a stream signal during that period of time, then the input signal 300 may be determined as a PCM digital audio signal; otherwise, the input signal 300 may be determined as a stream signal.

Once the input signal 300 has been determined as a PCM digital audio signal or a stream signal, the host controller 80 outputs to the input section controller 70 a control signal indicating that the determination is complete. In response to the control signal indicating completion of the determination, the input section controller 70 controls the signal input section 10 so as to begin the reading of the input signal 300 from the read position 310.

When the input signal 300 is read from the read position 310, the host controller 80 controls the signal processing section 30 so as to selectively prohibit outputting from the signal processing section 30 (or, in the alternative, selectively suppress the signal level which is output from the signal processing section 30), in accordance with the detection signal which is output from the synchronization signal detection section 20. Specifically, if the input signal 300 is determined as a PCM digital audio signal, then the host controller 80 permits outputting from the signal processing section 30 (or, in the alternative, boosts the signal level which is output from the signal processing section 30). If the input signal 300 is determined as a stream signal, then the host controller 80 prohibits outputting from the signal processing section 30 (or, in the alternative, suppresses the signal level which is output from the signal processing section 30).

Thus, by reading the input signal 300 ahead from a position which is beyond a predetermined region from the beginning of the input signal 300, and determining the type of the input signal 300 based on the signal which has been read ahead, it is possible to correctly determine the type of the input signal 300 even in the case where the beginning of the input signal 300 includes "garbage data".

Moreover, in the case of an input signal 300 which changes from a PCM digital audio signal to a stream signal (e.g., as that shown in FIG. 5F), reading the input signal 300 ahead of time makes it possible to reduce the amount of time which is required after the input signal 300 has changed from a PCM digital audio signal to a stream signal and before the type of the input signal 300 is properly determined.

Moreover, the signal processing section 30 is controlled by default so that any outputting therefrom is prohibited (or, in the alternative, the signal level which is output from the signal processing section 30 is suppressed) while the input signal 300 has not yet been determined as either a PCM digital audio signal or a stream signal, after which the reproduction of the input signal 300 is resumed from the beginning based on the result of such a determination. As a result, noise in the reproduced signal from the reproduction apparatus 2 can be eliminated or suppressed.

EXAMPLE 3

Figure 8:
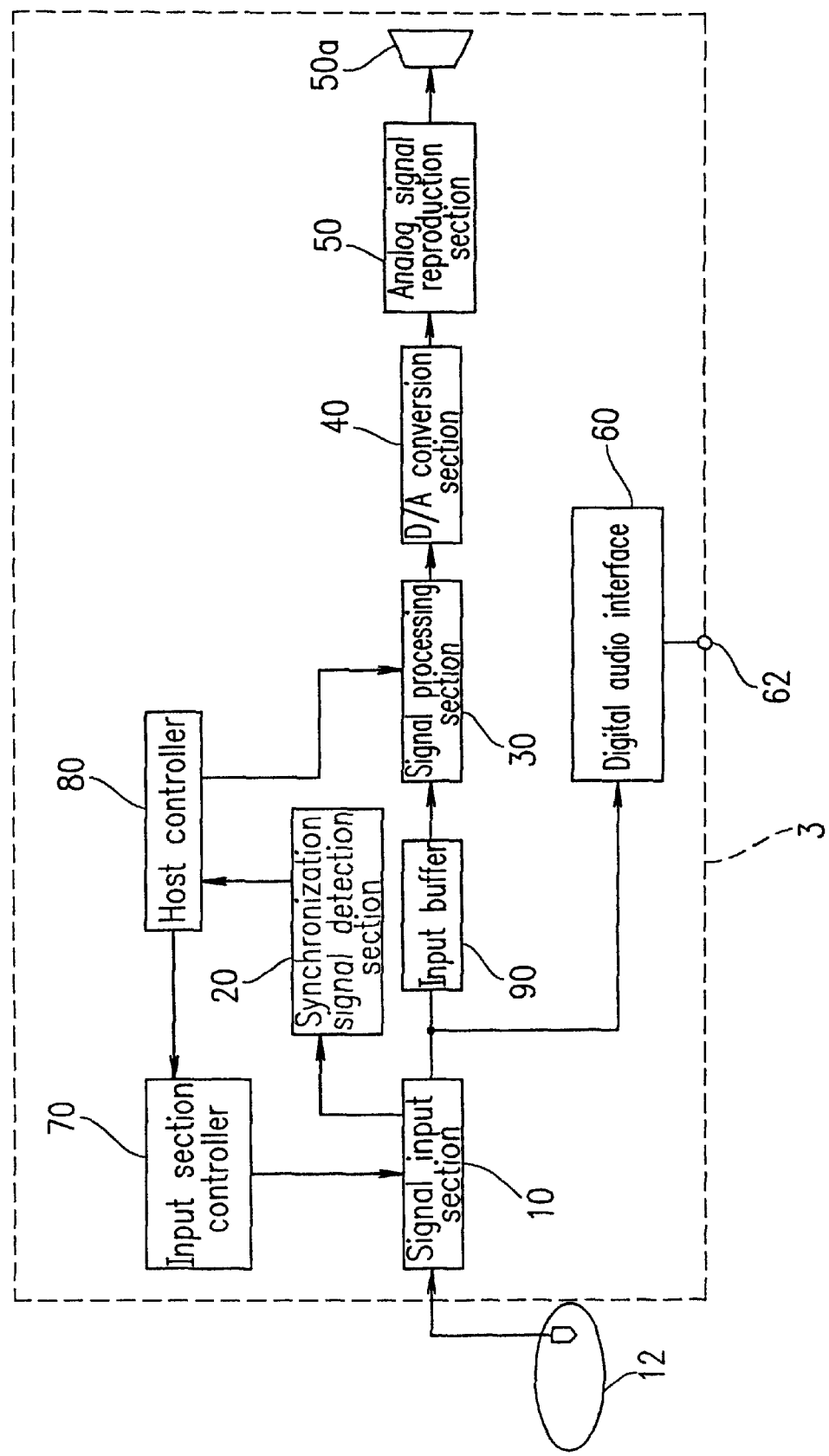
FIG. 8 is a block diagram illustrating a structure of a reproduction apparatus 3 according to Example 3 of the present invention.

FIG. 8 is a block diagram illustrating the structure of a reproduction apparatus 3 according to Example 3 of the present invention. The reproduction apparatus 3 includes an input buffer 90 in addition to the elements of the reproduction apparatus 2 illustrated in FIG. 6.

In FIG. 8, those constituent elements which also appear in FIG. 2 are denoted by the same reference numerals as those used therein, and thus description thereof is omitted hereafter.

The input buffer 90 temporarily stores an input signal. The input buffer 90 has a sufficient capacity for storing a predetermined number of data. By temporarily storing an input signal, it is ensured that any input signal will be input to the signal processing section 30 at a point in time which lags behind a point in time at which the input signal is input to the synchronization signal detection section 20 by an amount of time corresponding to the predetermined number of data storable in the input buffer 80.

From a relative perspective, this is equivalent to reading the input signal ahead because adjusting the maximum number of data temporarily stored in the input buffer 90 corresponds to adjusting the position from which to begin reading the input signal. Therefore, the reproduction apparatus 3 can attain similar effects to those described with respect to the reproduction apparatus 2 according to Example 2 of the present invention.

In accordance with the reproduction apparatus 3, it is ensured that, at any point during reproduction, an input signal will be input to the signal processing section 30 at a point in time which lags behind a point in time at which the input signal is input to the synchronization signal detection section 20. This time lag is adjusted so that the input signal type will have been determined by the synchronization signal detection section 20 by the time that the input signal is input to the signal processing section 30. As a result, even if the input signal changes from one type to another during reproduction, the signal processing section 30 is able to correctly determine the input signal type based on the input signal type as determined by the synchronization signal detection section 20.

In the case where the reproduction apparatus 3 already includes a buffer for temporarily storing an input signal as a means for preventing interruptions in the reproduced sound responsive to physical impacts, etc . . . such a buffer may also be utilized as the input buffer 90. As a result, increase in cost associated with the addition of the input buffer 90 can be prevented.

Furthermore, in accordance with the reproduction apparatus 3, the control to be performed by the host controller 80 can be more easily realized than in Example 2 of the present invention.

In any one of Examples 1 to 3, it is possible to adopt an alternative structure for the synchronization signal detection section 20, as discussed below, for example.

Figure 9:
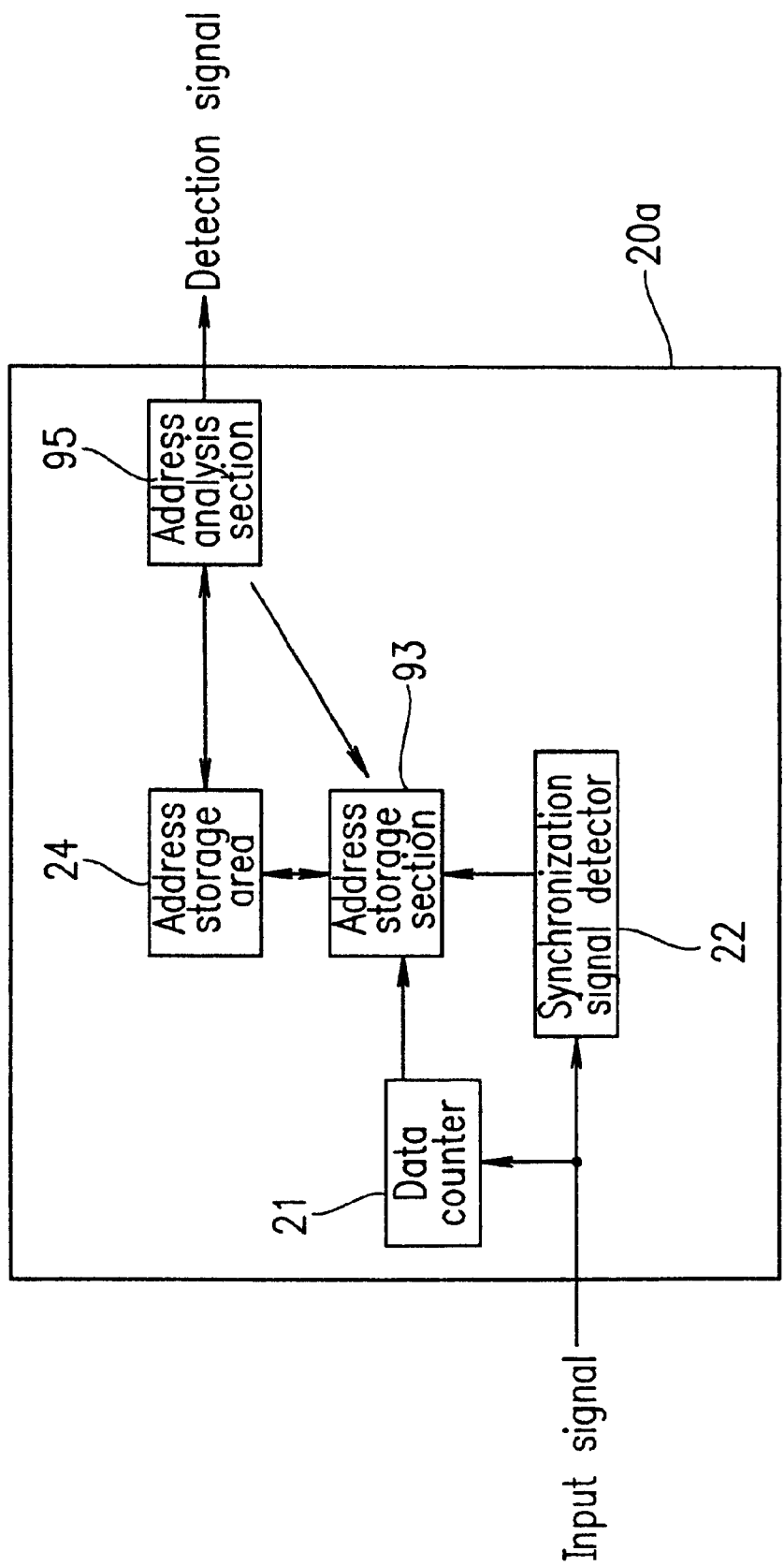

FIG. 9 illustrates the structure of an alternative synchronization signal detection section 20a, which may replace the synchronization signal detection section 20 (FIG. 3). In FIG. 9, those constituent elements which also appear in FIG. 3 are denoted by the same reference numerals as those used therein, and thus description thereof is omitted hereafter.

The address analysis section 95 outputs the address interval which occurs most frequently among a plurality of address intervals stored in the address interval table 24b (FIG. 4A) as a representative address interval value.

An address storage section 93 variably sets a predetermined range of addresses to be stored in the address table 24a in accordance with the representative address interval value. For example, the predetermined range may be prescribed at a value which is equal to four times the representative address interval value.

Thus, by setting the predetermined range of addresses to be stored in the address table 24a in a variable manner, the history of past address intervals to be retained in the address table 24a can be reduced in length as compared to the case where the predetermined range of addresses to be stored in the address table 24a is fixed. In addition, in the case where the input signal changes from a PCM digital audio signal to a stream signal (e.g., as that shown in FIG. 5F), it is possible to reduce the amount of time which is required after the input signal has changed from a PCM digital audio signal to a stream signal and before the input signal type is properly determined.

According to the present invention, a predetermined synchronization signal is detected in an input signal, and the input signal type is determined in accordance with the occurrence frequency with which a given interval repeatedly occurs between adjacent instances of the predetermined synchronization signal. As a result, it is possible to determine the input signal type without decoding the input signal, and to subject the input signal to signal processing which is suitable for the determined input signal type. As a result, noise in the reproduced signal output from the reproduction apparatus can be eliminated or suppressed.

Moreover, according to the present invention, the reproduction apparatus does not need to have an internal decoder. As a result, it is possible to reduce the cost for producing the reproduction apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reproduction apparatus comprising:
   a signal input section for receiving an input signal having an input signal type;
   a synchronization signal detection section for detecting a predetermined synchronization signal in the input signal and determining the input signal type in accordance with an occurrence frequency with which an interval repeatedly occurs between adjacent instances of the predetermined synchronization signal; and
   a signal processing section for subjecting the input signal to a signal processing which is suitable for the determined input signal type.

2. A reproduction apparatus according to claim 1, wherein the synchronization signal detection section determines whether or not the input signal is a stream signal containing the predetermined synchronization signal, and if the input signal is a stream signal, the signal processing section performs a signal processing for suppressing a signal level of the input signal.

3. A reproduction apparatus according to claim 1, wherein the synchronization signal detection section determines whether or not the input signal is a stream signal containing the predetermined synchronization signal, and if the input signal is not a stream signal, the signal processing section performs a signal processing for boosting a signal level of the input signal.

4. A reproduction apparatus according to claim 1, wherein the synchronization signal detection section includes:
   a data counter for counting a data amount in the input signal and outputting an address in the input signal;
   a synchronization signal detector for detecting the predetermined synchronization signal in the input signal and outputting a detection signal representing a result of the detection;
   an address storage section for storing a plurality of addresses output from the data counter in an address table in response to the detection signal; and
   an address analysis section for calculating an address interval between adjacent addresses among the plurality of addresses stored in the address table and calculating an occurrence frequency of the address interval, and determining the input signal type based on the calculated occurrence frequency of the address interval.

5. A reproduction apparatus according to claim 4, wherein the address storage section deletes from the address table any past addresses which go back in an address history beyond a predetermined range from a current address.

6. A reproduction apparatus according to claim 5, wherein the predetermined range is set in a variable manner.

7. A reproduction apparatus according to claim 4, wherein, in a case where a limited variety of the address interval is previously known to have a possibility of occurring, the address analysis section determines the input signal type in accordance with the occurrence frequencies with which the limited variety of the address interval occurs.

8. A reproduction apparatus according to claim 1, further comprising an input section controller for controlling the signal input section so as to read the input signal from a predetermined read position, and a host controller for controlling the input section controller and the signal processing section, wherein:
- the signal input section reads the input signal ahead from a predetermined position which is beyond a predetermined region from the beginning of the input signal;
- when the input signal is read from the predetermined position, the host controller places the signal processing section under a default control;
- the synchronization signal detection section determines the input signal type based on the input signal as read from the predetermined position;
- the signal input section reads the input signal from the beginning of the input signal after the input signal type has been determined; and
- the host controller controls the signal processing section so as to subject the input signal to a signal processing which is suitable for the determined input signal type.

9. A reproduction apparatus according to claim 1, further comprising an input buffer for temporarily storing the input signal, wherein the synchronization signal detection section detects the predetermined synchronization signal in the input signal stored in the input buffer.

10. A reproduction method comprising the steps of:

receiving an input signal having an input signal type;

detecting a predetermined synchronization signal in the input signal and determining the input signal type in accordance with an occurrence frequency with which an interval repeatedly occurs between adjacent instances of the predetermined synchronization signal; and subjecting the input signal to a signal processing which is suitable for the determined input signal type.

* * * * *